US009479513B1

(12) United States Patent
Jenkins et al.

(10) Patent No.: US 9,479,513 B1
(45) Date of Patent: Oct. 25, 2016

(54) APPARATUS, METHOD AND SYSTEM TO CONTROL ACCESSIBILITY OF PLATFORM RESOURCES BASED ON AN INTEGRITY LEVEL

(71) Applicant: Sandia Corporation, Albuquerque, NM (US)

(72) Inventors: Chris Jenkins, Albuquerque, NM (US); Lyndon G. Pierson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 2 days.

(21) Appl. No.: 14/661,174

(22) Filed: Mar. 18, 2015

Related U.S. Application Data

(60) Provisional application No. 61/955,919, filed on Mar. 20, 2014.

(51) Int. Cl.
*H04L 29/06* (2006.01)

(52) U.S. Cl.
CPC .............. *H04L 63/105* (2013.01); *H04L 63/20* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 2008/0115182 A1* | 5/2008 | van Willigenburg | H04N 21/2343 725/110 |
| 2008/0133729 A1* | 6/2008 | Fridman | H04L 12/581 709/223 |
| 2011/0099605 A1* | 4/2011 | Cha | H04W 12/06 726/3 |
| 2012/0278464 A1* | 11/2012 | Lehane | H04L 12/1407 709/223 |
| 2013/0212637 A1* | 8/2013 | Guccione | H04L 63/102 726/1 |
| 2014/0130119 A1* | 5/2014 | Goldschlag | H04L 63/20 726/1 |
| 2014/0280246 A1* | 9/2014 | Riggs | G06F 17/30598 707/752 |
| 2014/0380425 A1* | 12/2014 | Lockett | H04L 63/20 726/4 |
| 2015/0058842 A1* | 2/2015 | Chen | G06F 9/5005 718/1 |

OTHER PUBLICATIONS

Jenkins, C., "Integrity Levels: A New Software Paradigm for Protecting Computing Systems, Sandia National Laboratories, Nov. 21, 2013 presentation at Rensselaer Polytechnic Institute, Troy, NY", Nov. 21, 2013, 53 pgs.
Microsoft, "Designing Applications to Run at a Low Integrity Level," © 2015 Microsoft, https://msdn.microsoft.com/en-us/library/bb625960.aspx, last accessed Mar. 16, 2015, (2015), 4 pgs.

(Continued)

*Primary Examiner* — Hadi Armouche
*Assistant Examiner* — Ali Shayanfar
(74) *Attorney, Agent, or Firm* — Madelynne J. Farber

(57) ABSTRACT

Techniques and mechanism to selectively provide resource access to a functional domain of a platform. In an embodiment, the platform includes both a report domain to monitor the functional domain and a policy domain to identify, based on such monitoring, a transition of the functional domain from a first integrity level to a second integrity level. In response to a change in integrity level, the policy domain may configure the enforcement domain to enforce against the functional domain one or more resource accessibility rules corresponding to the second integrity level. In another embodiment, the policy domain automatically initiates operations in aid of transitioning the platform from the second integrity level to a higher integrity level.

23 Claims, 8 Drawing Sheets

(56) References Cited

OTHER PUBLICATIONS

Microsoft, "How the Integrity Mechanism Is Implemented in Windows Vista," © 2015 Microsoft, https://msdn.microsoft.com/en-us/library/bb625962.aspx, last accessed Mar. 16, 2015, (2015), 4 pgs.
Microsoft, "What is the Windows Integrity Mechanism?" © 2015 Microsoft, https://msdn.microsoft.com/en-us/library/bb625957.aspx, last accesses Mar. 16, 2015 (2015), 2 pgs.
Microsoft, "Windows Integrity Mechanism Design," © 2015 Microsoft, https://msdn.microsoft.com/en-us/library/bb625963.aspx, last accessed Mar. 16, 2015, (2015), 10 pgs.
Microsoft, "Windows Vista Integrity Mechanism Technical Reference," © 2015 Microsoft, https://msdn.microsoft.com/en-us/library/bb625964.aspx, last accessed Mar. 12, 2015, (2015), 1 pg.
Vasudevan, A., et al., "Requirements for an Integrity-Protected Hypervisor on the x86 Hardware Virtualized Architecture", the 3rd International Conference on Trust and Trustworthy Computing (Trust 2010), Jun. 2010, https://www.truststc.org/pubs/754.html, last accessed Mar. 9, 2015, 15 pgs.

* cited by examiner

400

| | Conditions | | | |
|---|---|---|---|---|
| | $C_1$ | $C_2$ | ... | $C_v$ |
| Weights | $w_1$ | $w_2$ | ... | $w_v$ |

410a

| $\Delta(S_{g1}, S_r)$ | $C_{a1}$ | ... | $C_{n1}$ | $k_1 = |\{C_{a1},...,C_{n1}\}|$ |
|---|---|---|---|---|
| | $w_{a1}$ | ... | $w_{n1}$ | $w_{tot1} = \Sigma(w_{a1},...,w_{n1})$ |
| | | | | $\Delta IL_1 = IL(S_{g1}) - IL(S_r)$ |

410b

| $\Delta(S_{g2}, S_r)$ | $C_{a2}$ | | | $k_2 = |\{C_{a2}\}| = 1$ |
|---|---|---|---|---|
| | $w_{a2}$ | | | $w_{tot2} = \Sigma(w_{a2}) = w_{a2}$ |
| | | | | $\Delta IL_2 = IL(S_{g2}) - IL(S_r)$ |

⋮

410m

| $\Delta(S_{gm}, S_r)$ | $C_{am}$ | ... | $C_{nm}$ | $k_m = |\{C_{am},...,C_{nm}\}|$ |
|---|---|---|---|---|
| | $w_{am}$ | ... | $w_{nm}$ | $w_{totm} = \Sigma(w_{am},...,w_{nm})$ |
| | | | | $\Delta IL_m = IL(S_{gm}) - IL(S_r)$ |

FIG. 4

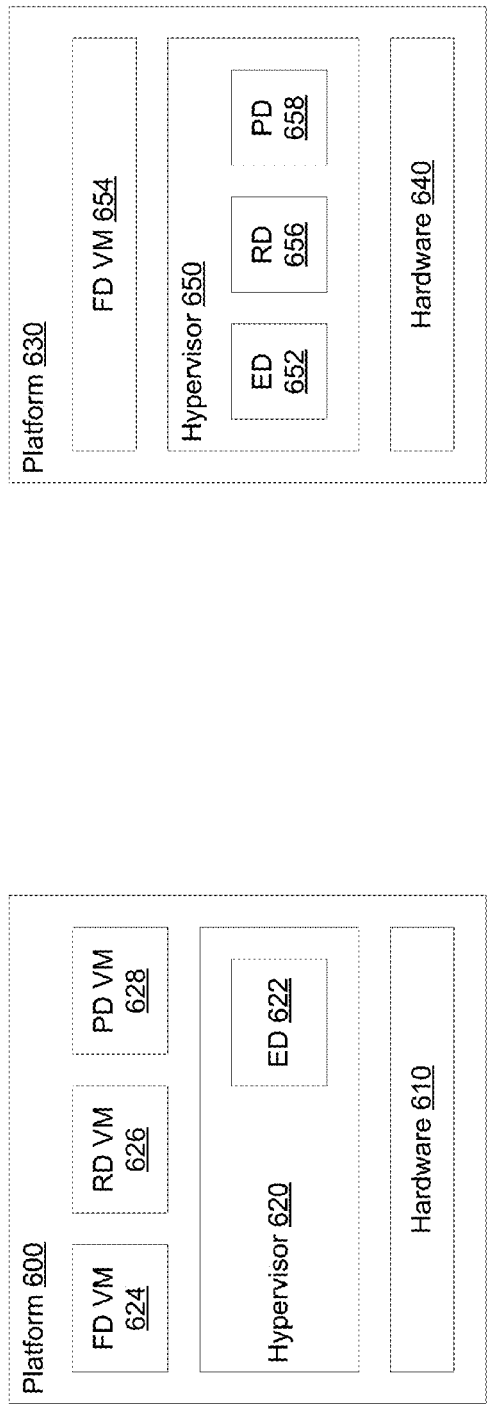
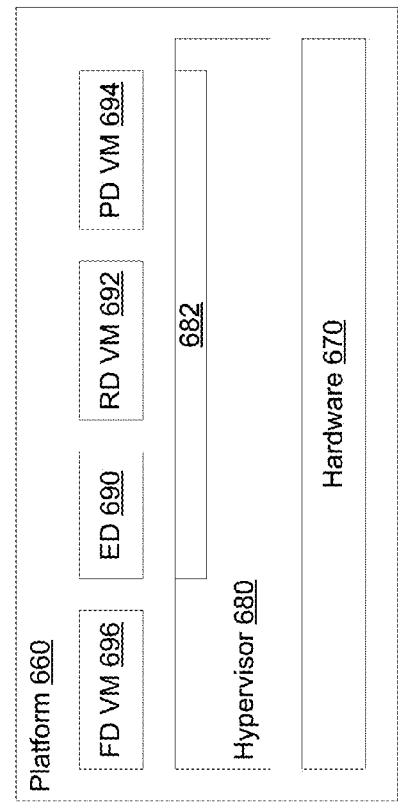
FIG. 6B
FIG. 6C
FIG. 6A

APPARATUS, METHOD AND SYSTEM TO CONTROL ACCESSIBILITY OF PLATFORM RESOURCES BASED ON AN INTEGRITY LEVEL

CROSS-REFERENCE TO RELATED APPLICATIONS

This application claims priority under the provisions of 35 U.S.C. §119(e) to U.S. Provisional Application No. 61/955,919 filed Mar. 20, 2014, the contents of which are incorporated herein by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

BACKGROUND

1. Technical Field

Embodiments discussed herein relate generally to the field of computer security and more particularly, but not exclusively, to controlling accessibility of platform resources.

2. Background Art

A computer that is networked with other devices via the Internet, or other such networking environment, risks exposure to attacks by viruses or other malware. Some malware allows a malicious agent to gain information about a user and/or about operation of the computer. Other malware attacks runtime operation of the computer. Often, a user of a computer is unaware of the fact that the computer has been compromised by such malware.

As the number, variety and sophistication of computer network threats continues to grow, there is an increasing demand for technologies that enable computing-capable platforms to effectively respond to, or even anticipate, such threats. This increased demand is complicated by the trend towards platforms supporting an increasingly high degree of network connectivity, storage capacity, and accessibility by a variety of users and/or services.

BRIEF DESCRIPTION OF THE DRAWINGS

The various embodiments of the present invention are illustrated by way of example, and not by way of limitation, in the figures of the accompanying drawings and in which:

FIG. 4 shows tables illustrating elements of policy information accessed to determine a goal integrity level according to an embodiment.

FIGS. 6A-6C are functional block diagrams each illustrating elements of a respective platform to change resource accessibility based on an integrity level according to a corresponding embodiment.

DETAILED DESCRIPTION

Embodiments discussed herein variously relate to techniques and/or mechanisms that enable a computer platform to change an accessibility of resources in a graceful manner while maintaining runtime operation. In an embodiment, a system detects a loss of integrity for one or more hardware components and/or software components of a computing-capable platform, and dynamically migrates the platform to a lower level of functionality. The system may take further measures to establish (e.g., reestablish) a relatively high integrity level of the platform. The ability to check components of a system at runtime (and in some embodiments, at load time) may aid in mitigating the risk and/or effects of malware attacks.

In some embodiments, component checking is performed with a trusted platform module (TPM) or other trusted computing platform (TCP) logic that enable integrity levels in embedded systems. An integrity level may determine or otherwise correspond to a degree to which one component trusts a given environment or other component(s). Depending on the integrity level, the platform may not process or send certain data until a desired level exists. Also, gracefully reducing functionality in a compromised platform may allow critical and non-critical components to react in an effective manner.

Figure 1:
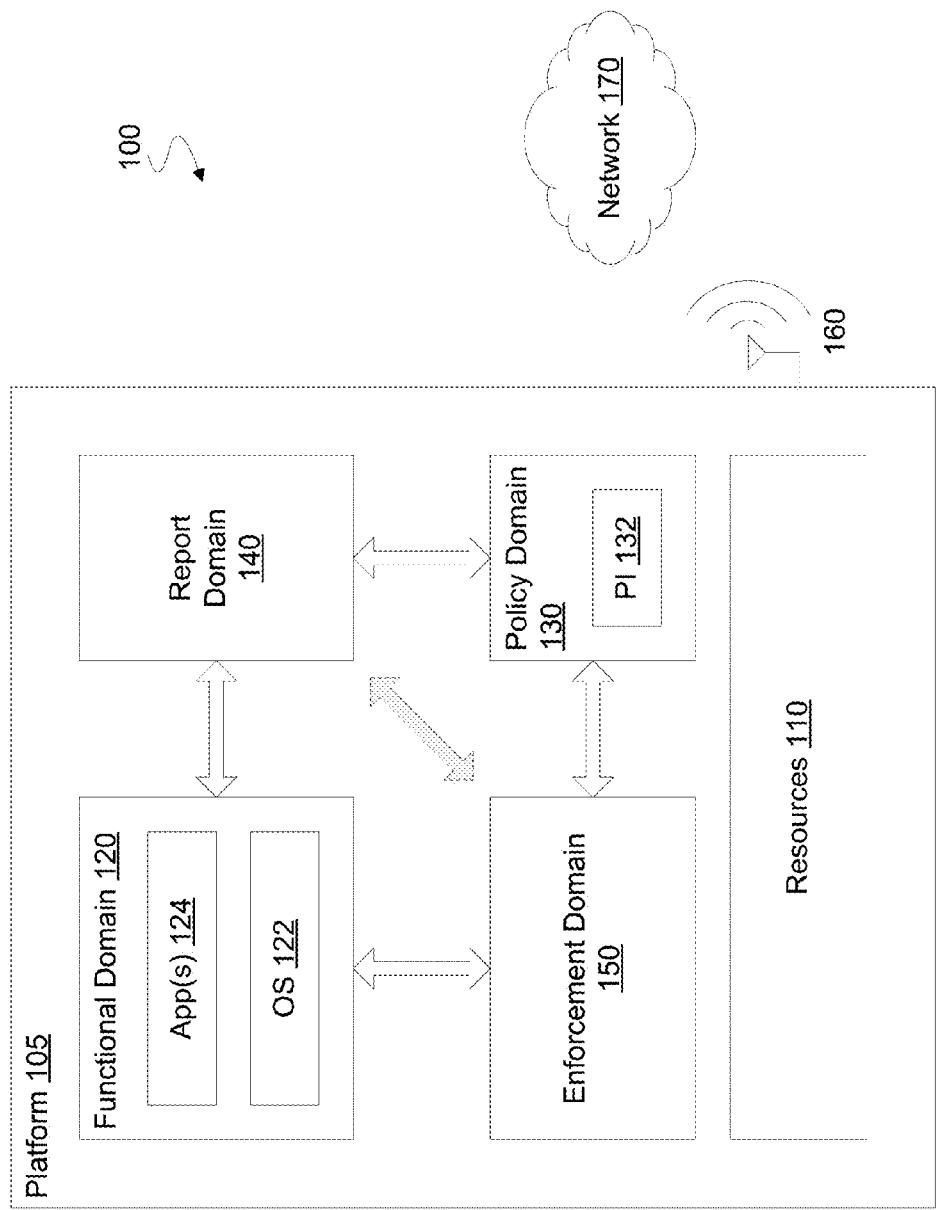
FIG. 1 is a functional block diagram illustrating elements of a system to variously change resource accessibility according to an embodiment.

FIG. 1 illustrates elements of a system 100 to control accessibility of resources according to an embodiment. System 100 includes a platform 105 comprising resources—e.g., including hardware resources and/or software resources—and logic to variously limit or otherwise change accessibility of such resources based on a level of trust associated with a current state of platform 105. A platform state may include multiple constituent states (also referred to herein as conditions) that, for example, each include or are otherwise based on a respective states of one or more platform components. Such platform component states may include, for example, a current value of a program counter, information currently stored in system memory and/or any of various other conditions of components that comprise platform 105. As illustrated herein, some platform states may be assigned as a group into a particular integrity level—e.g., where the respective constituent states of such platform states are considered to have similar integrity (and/or similar likelihood of malicious compromise). Platform 105 may include—or provide for operation as a component of—a server, desktop computer, laptop computer, handheld device (e.g., smartphone, tablet, palmtop, e-reader), game console, smart television or other computing-capable device.

Although certain embodiments are not limited in this regard, platform 105 may be operable to communicate with one or more networks that are included in or coupled to system 100. For example, platform 105 may include a network interface card (NIC), modem or any of various other wired and/or wireless network communication mechanisms—as represented by the illustrative antenna 160—to communicate with a network 170 of system 100. Network 170 may comprise one or more wired networks and/or wireless networks including, but not limited to, an Internet, a local area network (LAN), a virtual LAN, a wide area network (WAN), a home area network, a cloud network and any of a variety of other private, public, government or other network systems.

During runtime operation, platform 105 may transition to different states at different times. A given runtime state of the platform 105 may be characterized by one or more conditions of software and/or hardware of platform 105. Platform 105 includes mechanisms to change an accessibility of resources based on a detected state of platform 105. In some embodiments, such mechanisms automatically initiate operations to try to transition runtime operation of platform 105 from a state associated with a given level of trust (also referred to herein as an integrity level) to another state associated with a relatively higher level of trust.

For example, platform 105 may include resources 110 that are to be variously made accessible to a domain of platform 105, which is represented by the illustrative functional domain 120. A resource may include, for example, some logic (e.g., comprising hardware, executing software and/or firmware) and/or some or all functionality implemented with such logic. For example, a resource may be some portion of a functionality provided by underlying hardware and/or software, where another portion of that same functionality may be a different resource. By way of illustration and not limitation, a first amount of traffic bandwidth on a system bus and a second amount of traffic bandwidth on that same system bus may be different resources, where a determination to make the first amount of traffic bandwidth available (or unavailable) to a functional domain is distinct from another determination to make the second amount of traffic bandwidth available (unavailable) to that functional domain. Resources may include respective portions of functionality provided by underlying logic, where such portions are distinguished from another by amount of functionality and/or type of functionality. Resources 110 may comprise any of a variety of hardware resources, software functionality, etc. including, but not limited to, one or more of a system bus or other interconnect, a cache memory, main memory or data storage (e.g., including one or more solid state disks and/or hard disc drives), one or more processor cores, a graphics processor, a memory controller, controller hub or other controller logic, clock signal control circuitry, power management logic, one or more peripherals, networking access hardware, any of various buffers, drivers, protocol stacks, interfaces, executable instructions, software subroutines, software libraries, and/or the like.

As used herein, "domain" refers to a functional set of logic (e.g., including any of a variety of combinations of hardware, firmware and/or executing software) to provide one functionality, where such a domain is at least partially protected from access by—and/or at least partially prevented from access to—some other domain that is to provide another functionality. A given domain may be considered to include operations of circuit logic that are to execute a software process of that given domain. However, other operations of the same circuit logic may be outside of the given domain—e.g., where such operations are instead to execute a process of a different domain. Accordingly, resources 110 may be distinguished, for example, some processor logic and memory in its capacity of executing a software process of functional domain 120.

Functional domain 120 is a domain for which accessibility to resources 110 is controlled using other domains of platform 105—e.g., including a policy domain 130, a report domain 140 and an enforcement domain 150. Functional domain 120 may include at least one execution environment that is distinct from any processes executing with policy domain 130, report domain 140 or enforcement domain 150. The functional domain 120 may provide functionality explicitly requested by a user of platform 105, while the domains 130, 140, 150 operate to protect integrity of platform 105 in the providing of such functionality. In an embodiment, functional domain 120 includes an operating system (OS) 122 and, for example, one or more applications 124 executing with OS 122. OS 122 may be a host operating system, where any virtual machines executed by platform 105 are executed on OS 122 and within functional domain 120. Alternatively, functional domain 120 may include a virtual machine, the execution of which is managed by hypervisor, virtual machine manager (VMM) or other such process (not shown) distinct from functional domain 120. In such an embodiment, the hypervisor or VMM process may execute on a host OS of platform 105 that is external to functional domain 120—e.g., where OS 122 is a guest operating system.

Report domain 140 may include logic (e.g., including hardware, firmware and/or executing software) configured to monitor operation of functional domain 120 and to report to policy domain 130 one or more conditions of platform 105 at a given time during such operation. By way of illustration and not limitation, report domain 140 may perform snooping, polling or other operations to monitor conditions of one or more buffers, buses, power sources, interrupt handlers, bus traffic, memory access requests, cache operations and/or other operational aspects of platform 105 that are due to execution of one or more processes of functional domain 120. In some embodiments, report domain 140 scans functional domain 120 for known malware, or accesses results of such a scan performed by functional domain 120 itself. Functionality of report domain 140 may be adapted in part from conventional system monitoring techniques and/or mechanisms, which are not detailed here in to avoid obscuring certain features of various embodiments. Although report domain 140 is represented as communicating directly with functional domain 120, in some embodiments, report domain 140 may perform some or all monitoring of functional domain 120 via enforcement domain 150.

Policy domain 130 may include logic to determine, based on condition information provided by report domain 140, whether (and if so, how) an accessibility of resources 110 to functional domain 120 is to be changed. In an embodiment, policy domain 130 resides in a trusted platform module (TPM) or other dedicated circuitry that is protected by hardware mechanisms from direct access by functional domain 120. Policy domain 130 may include or otherwise have access to policy information PI 132 that is to serve as reference information in determining resource accessibility rules. In an embodiment, PI 132 identifies a plurality of integrity levels that each represent a respective level of trust in platform 105—e.g., where the integrity levels each correspond to a different respective level of trust in functional domain 120. PI 132 may define a given state of platform 105 as being assigned to a particular integrity level (or "IL"). Alternatively or in addition, PI 132 may specify or otherwise indicate, for example, one or more conditions that comprise a given state of platform 105, a particular integrity level assigned to (or otherwise defined as corresponding to) a given state or states, and/or one or more resource accessibility rules that, per a given policy, correspond to a particular integrity level. A resource accessibility rule of PI 132 may specify for each of one or more resources a respective level of accessibility and/or type of accessibility that is available to some or all processes of functional domain 120. Specifying such accessibility may include defining a level and/or type of resource inaccessibility, for example.

PI 132 may be made available to policy domain 130 as a priori information provided, for example, from outside of platform 105. By way of illustration and not limitation, PI 132 may be generated based on performance modeling that is performed by a system analyst or other external agent. In some embodiments, PI 132 is generated based on statistical analysis of the performance of platform 105 and/or other logic of system 100. Although certain embodiments are not limited in this regard, PI 132 may be dynamically updated during runtime operation of platform 105—e.g., in response to report domain 140, policy domain 130 or some other agent identifying new information regarding security of system 100. PI 132 may be determined based on a list of functionality to be made available to a user by functional domain 120. For example, determining PI 132 may include identifying all user functionality to be made available to a user by FD 120 when processes of FD 120 are considered to be fully trusted—e.g., intact and not suffering from malicious modification or subversion. One or more subsets of such functionality may then be identified, each subset to be made available via FD 120 based on respective conditions identified as indicating a corresponding level of potential compromise to the integrity of FD 120. A system function that may be available from multiple redundant sources of the platform—e.g., a functionality to identify a current date and time—might remain available to a user even if platform state indicates severe compromise of the integrity of the system. In another example, communications via a network to determine account balances, but to disallow account transactions, may be allowed until a relatively high system integrity is re-established.

Policy domain 130 may include PI 132 prior to use thereof to determine a change to an accessibility of resources 110. For example, PI 132 may be loaded into a memory of policy domain 130 from a hard disk drive, solid state disk or other non-volatile memory—e.g., during boot up of platform 105. Although certain embodiments are not limited in this regard, PI 132 may be provided from a remote agent to platform 105 via one or more communication paths that are not accessible to software executed by functional domain 120. By way of illustration and not limitation, some or all of PI 132 may be received by platform 105 using an execution thread other than any thread used to execute software of functional domain 120. Alternatively or in addition, some or all of PI 132 may be received in a tunneled channel, a sideband channel or other dedicated communication path to which functional domain 120 does not have access. Certain embodiments are not limited with respect to a particular source from which, and/or means by which, platform 105 may initially receive PI 132.

Based on PI 132, policy domain 130 may evaluate monitoring information from report domain 140 to determine whether a predefined state of platform 105—e.g., including a state of functional domain 120—currently exists. In an illustrative scenario according to one embodiment, policy domain 130 detects a transition of functional domain 120 from a first state associated with a first integrity level to a second state that is associated with a second integrity level. The first integrity level may be defined in PI 132 as corresponding to a first set of one or more rules defining accessibility of resources 110 to functional domain 120. By contrast, the second integrity level may be defined in PI 132 as corresponding to a second set of one or more rules defining a different accessibility of resources 110 to functional domain 120. For brevity, a set of one or more resource accessibility rules is referred to herein as a "rule set."

In response to detecting the transition from the first integrity level to the second integrity level, policy domain 130 may signal that enforcement domain 150 is to transition from a first configuration (to enforce the first rule set against functional domain 120) to a second configuration (to enforce the second rule set against functional domain 120). To accomplish this, the enforcement domain 150 may perform its own monitoring of FD 120 (e.g., as described herein for RD 140) in order to detect for and interrupt undesired functionality as specified by the PD 130. Enforcement domain 150 may comprise logic to selectively allow, prevent or qualify access by functional domain 120 to resources 110. For example, enforcement domain 150 may—according to a given rule set—control allocation of buffer space, processing time, memory access, storage disc access, system bus time slots, clock gating, power distribution and/or any of a variety of other resources requested—explicitly or implicitly—by one or more software processes of functional domain 120. Functionality of enforcement domain to selectively allocate (or forego allocating) a degree and/or type of access to a given resource may be adapted from conventional resource access and system policy enforcement techniques, which are not detailed herein to avoid obscuring features of various embodiments.

Figure 2A:
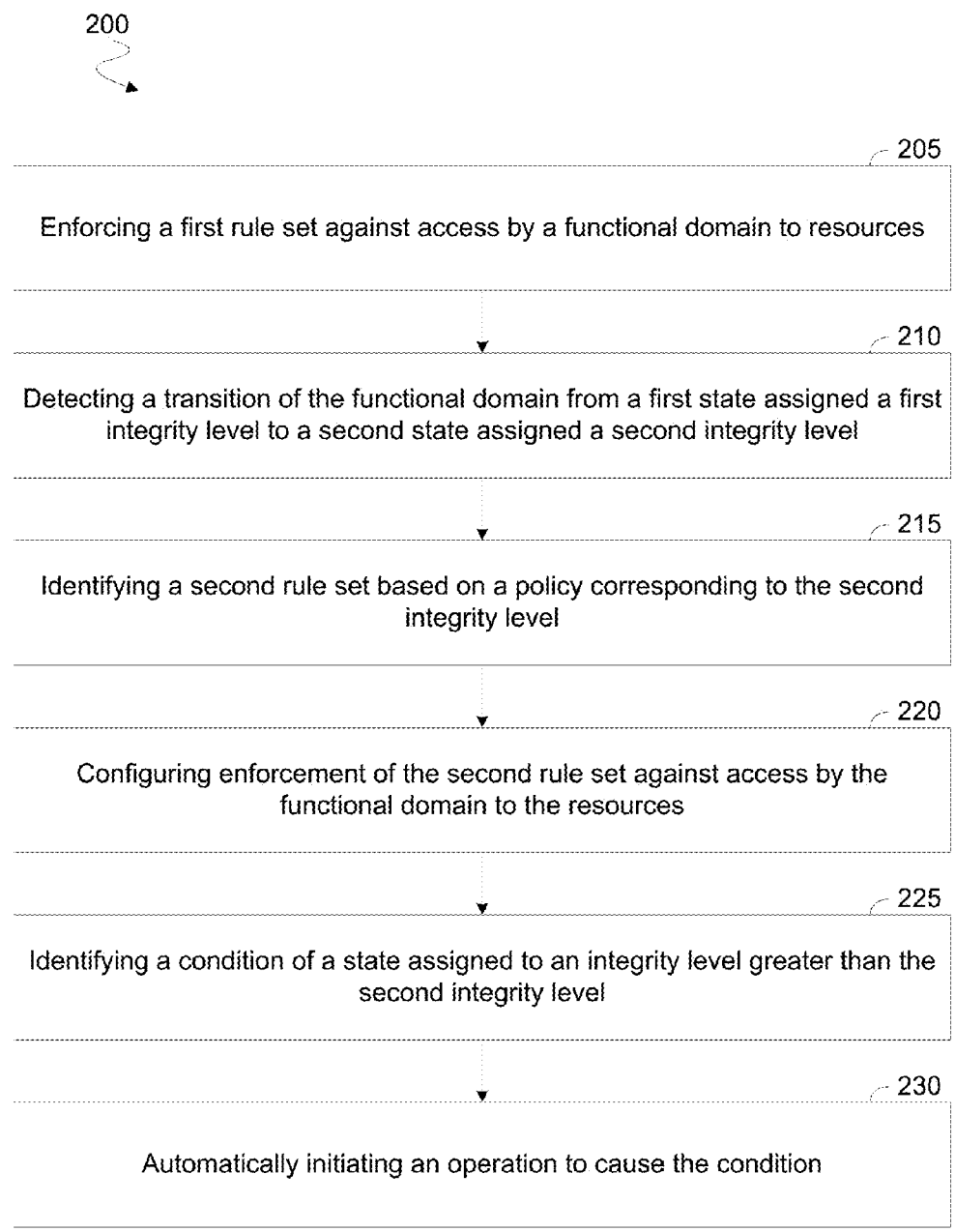
FIG. 2A is a flow diagram illustrating elements of a method to change an accessibility of platform resources according to an embodiment.

FIG. 2A illustrates elements of a method 200 for determining an accessibility of platform resources according to an embodiment. Method 200 may be performed at a platform including some or all of the features of platform 105—e.g., where method 200 determines an accessibility of resources 110 by functional domain 120.

In an embodiment, method 200 includes, at 205, enforcing a first rule set against access by a functional domain (or "FD") of the platform to resources of the platform. The enforcing at 205 may include an enforcement domain (or "ED") of the platform applying one or more accessibility rules of the first rule set each to selectively allow or prevent a level of access and/or a type of access to the resources. The enforcement domain may be configured to perform the enforcing at 205 by a policy domain (or "PD") of the platform, for example. Such configuration of the enforcement domain may be a default or initial configuration—e.g., after a bootup of the platform—or, alternatively, a later configuration that is due to a state transition (not shown) detected during runtime operation of the platform. Some or all rules of a rule set (and some or all rule sets, in some embodiments) may each define respective resource accessibility and/or inaccessibility at the level of granularity of the entire functional domain—i.e., where one or more resource accessibility rules each apply to all software processes running in an execution environment of such a functional domain.

Method 200 may further comprise, at 210, detecting a transition of the functional domain from a first state to a second state, wherein the first state is assigned a first integrity level and the second state is assigned a second integrity level less than the first integrity level. The detecting at 210 may occur during enforcement of the first rule set at 205. In an embodiment, the detecting at 210 includes a report domain (or "RD") of the platform monitoring the functional domain and, based on such monitoring, indicating one or more conditions of the platform to the policy domain. Such one or more conditions may be identified—e.g., by the report domain or the policy domain—as satisfying a predetermined definition for a particular state of the platform. Although certain embodiments are not limited in this regard, such state definition information may be available to the policy domain, but not to the report domain or the functional domain of the platform.

In response to the detecting at 210, method 200 may, at 215, identify a second rule set based on a policy corresponding to the second integrity level. For example, the policy domain may include or otherwise have access to policy information describing an association of different states of the functional domain each with a respective one of a plurality of integrity levels including the first integrity level and second integrity level. Such integrity levels may each represent a different respective level of trust to be placed in platform 105 during a corresponding state of platform 105. The policy information may further include policies that each define, for a corresponding one of the integrity levels, a different respective set of one or more resource accessibility rules. The identifying at 215 may comprise searching, from among such policies, a policy corresponding to the second integrity level, the policy identifying the second set of rules to be enforced against the functional domain during the second state.

In an embodiment, method 200 further comprises, at 220, configuring enforcement of the second rule set against access by the functional domain to the resources. For example, the policy domain may identify the one or more resource accessibility rules of the second rule set to the enforcement domain—e.g., where such one or more resource accessibility rules are not explicitly identified to some or all software processes executing in the functional domain. Subsequent to the configuring at 220, method 200 may perform additional operations (not shown) to enforce the second rule set against access by the functional domain to the resources. For example, if a given region of memory cannot be written (e.g., by system call table, interrupt vector table, kernel jump table, etc.) according to the policy including the second rule set, the enforcement domain will be configured to prevent such writing by the functional domain. If the functional domain subsequently attempts such a write, the enforcement domain will decline the access. In an embodiment, the enforcement domain may inform the policy domain of the attempted access—e.g., where in response, the policy domain updates the integrity level. One or both of the enforcement and report domains may be notified of such change.

At 225, method 200 may identify, based on the second integrity level to which the platform has transitioned, a condition of a state assigned an integrity level greater than (i.e., representing a higher level of trust than) the second integrity level. For example, policy information available to the policy domain may identify one or more states as being assigned a particular integrity level that is greater than the second integrity level. The policy domain may perform an evaluation that results in that particular integrity level being identified as a goal integrity level for the platform. Such an evaluation may further identify, from among the one or more states assigned to the goal integrity level, a particular state as being a goal state for the platform. Such an evaluation may further identify a particular condition of the goal state as being a goal condition that has to be satisfied to transition the platform to the goal state (and thus, to the associated goal integrity level).

Method 200 may further comprise, at 230, automatically initiating an operation to cause—i.e., satisfy—the condition identified at 230. For example, the initiating at 230 may include the policy domain signaling the enforcement domain that one or more changes to the operation of the functional domain are to take place, where in response, the enforcement domain communicates to the functional domain one or more corresponding actions to be taken.

Figure 2B:
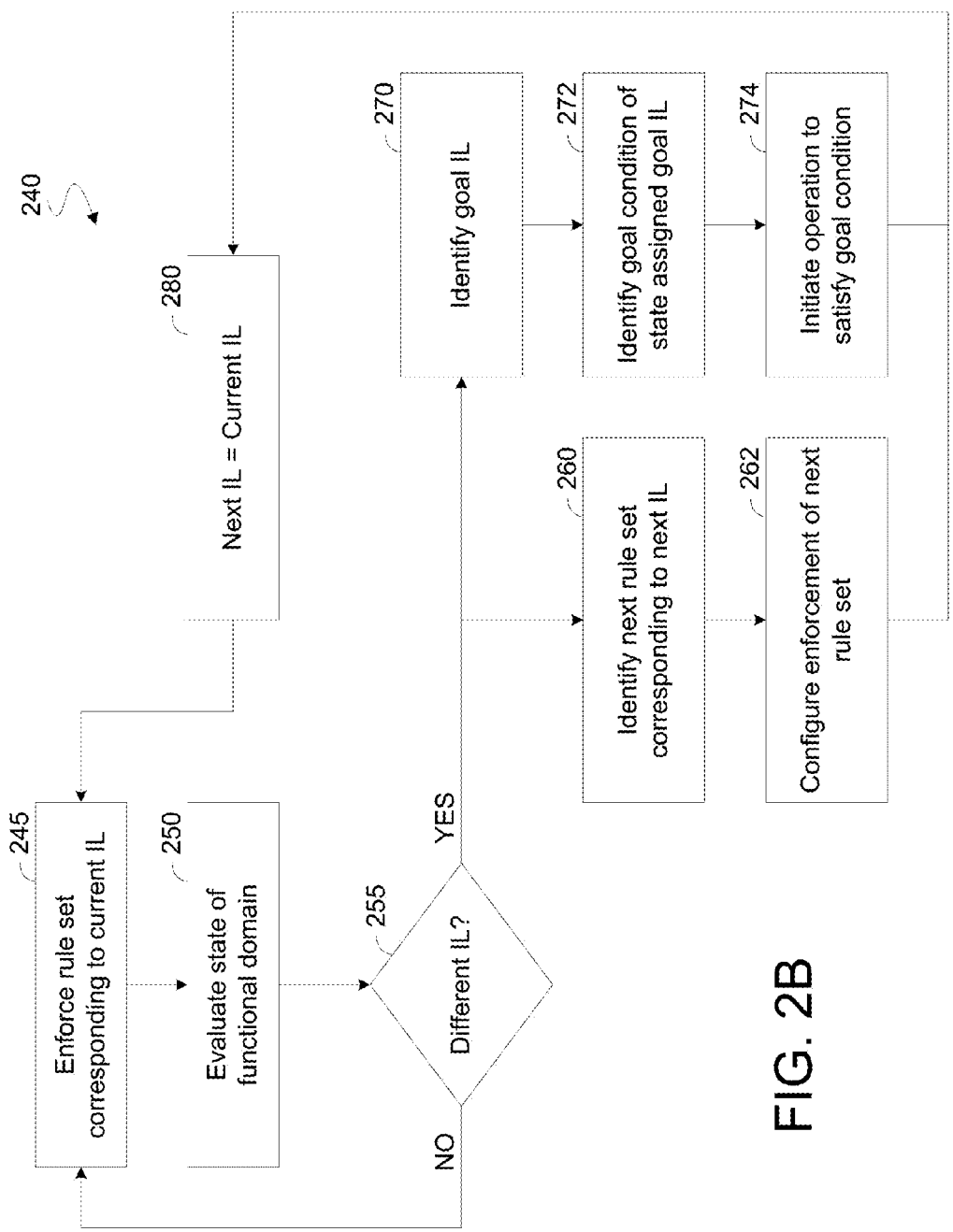
FIG. 2B is a flow diagram illustrating elements of a method to determine resource accessibility according to an embodiment.
Figure 3:
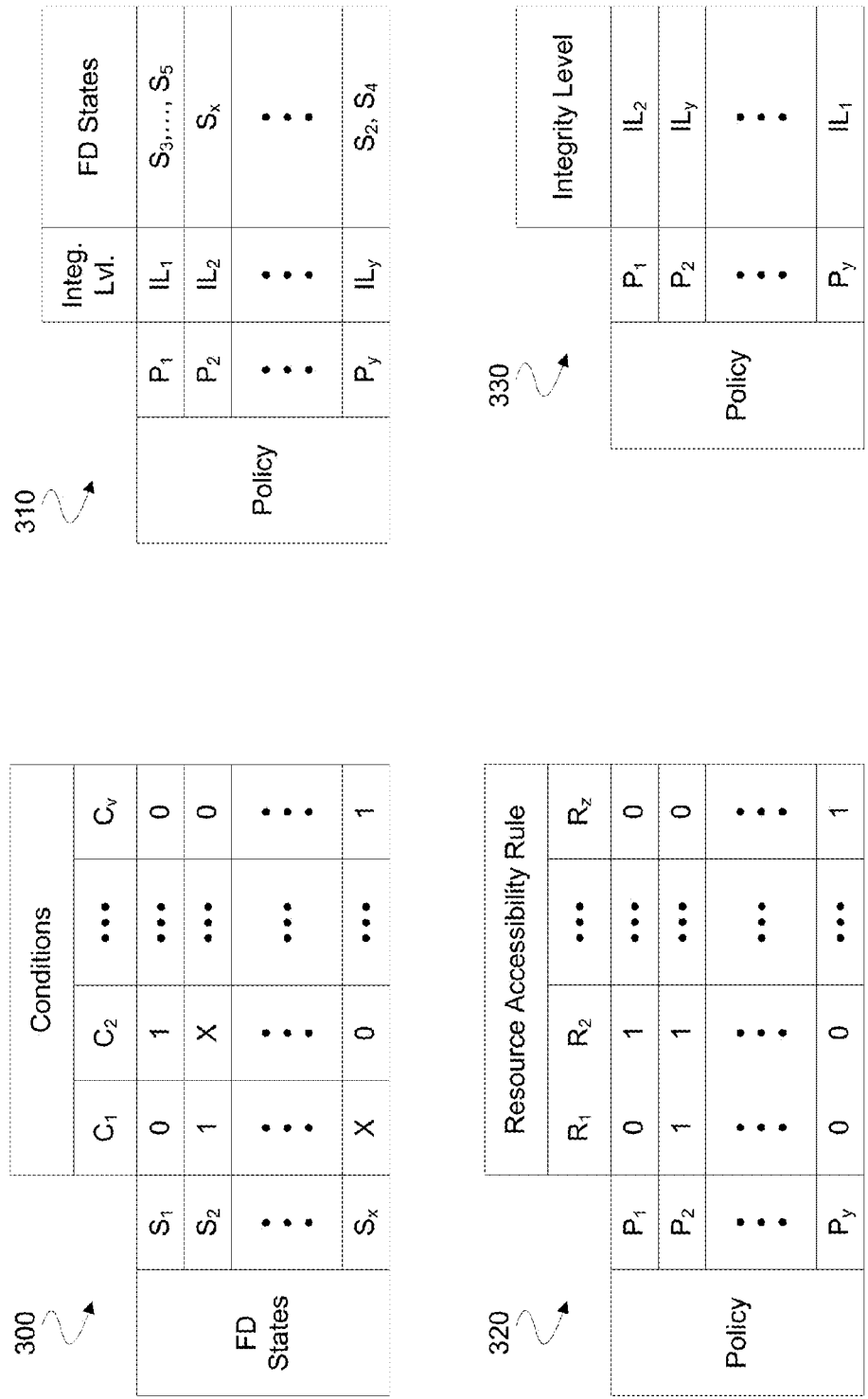
FIG. 3 illustrates elements of policy information to determine a set of one or more resource accessibility rules to enforce according to an embodiment.

FIG. 2B illustrates elements of a method 240 for controlling access to resources of a platform according to an embodiment. Method 240 may be performed by platform 105, for example. In an embodiment, method 240 includes some or all of the features of method 200—e.g., where method 240 provides for iterative performance of one or more operations of method 200. To illustrate certain features of various embodiments, method 240 is described herein with respect to policy information and calculations variously shown in FIGS. 3 and 4. However, such description may be extended to additionally or alternatively apply to other policy information and/or calculations discussed herein. The policy information and calculations shown in FIGS. 3 and 4 are not limited to use by method 240 and may, for example, be additionally or alternatively used in method 200 or other methods according to various embodiments.

Method 240 may include, at 245, enforcing a rule set corresponding to a current integrity level of the platform. The enforcing at 245 may include some or all operations of the enforcing at 205, for example. In an embodiment, an enforcement domain of the platform is configured by a policy domain of the platform to enforce the first rule set. The policy domain may include policy information such as that represented by tables 300, 310, 320 of FIG. 3. As illustrated by table 300, such policy information may define some set of states of a functional domain, as represented by the illustrative states $S_1, S_2, \ldots, S_x$. For each of the states $S_1, S_2, \ldots, S_x$, the policy information may define a respective set of one or more conditions of the functional domain that are true (or not true) during that state. By way of illustration and not limitation, table 300 identifies conditions $C_1, C_2, \ldots, C_v$, and provides for each of states $S_1, S_2, \ldots, S_x$ a corresponding bitmap or other data structure specifying a different respective combination of $C_1, C_2, \ldots, C_v$ that is to exist during the corresponding state. Table 300 includes values "0," "1" and "X" to indicate, respectively, whether a condition is false during a given state, true during that state, or not relevant (a "don't care" condition) with respect to that state. The particular values shown in table 300 are merely illustrative of one embodiment.

For example, some or all of conditions $C_1, C_2, \ldots, C_v$ may each represent a respective test condition that is satisfied when a particular type of access to a resource (or a combination of resources) is attempted. Such a test condition may be satisfied by virtue of the corresponding access being successful (or alternatively unsuccessful), or merely by virtue of the access being attempted. In an illustrative scenario according to one embodiment, various regions of a memory may each be associated with a different respective condition. Such a condition may be defined, for example, based on one or more attributes (e.g., including a type, environment, size, virtual address, etc.) of the corresponding memory region. The one or more attributes may each have a corresponding value—e.g., a type "execute but write", an environment "superuser", a size 1024 bytes and/or a virtual address 0xfc434343. The attributes may be used to specify at least one condition—of possibly many conditions—that comprise a state that is associated with a particular integrity level. Violation of the at least one condition—e.g. by an attempt to write to that region—may contribute to the state being satisfied, resulting in an automatic enforcement response according to a policy corresponding to the integrity level.

Method 240 may further comprise, at 250, evaluating a state of the functional domain. For example, the evaluating at 250 may include a report domain monitoring conditions of the platform that are based on operation of the functional domain. The report domain may report current condition information to the policy domain, which evaluates such condition information based on table 300 to determine whether a particular one of states $S_1, S_2, \ldots, S_x$ exists. In another embodiment, the report domain has access to table 300 for use in identifying and reporting to the policy domain a currently existing one of states $S_1, S_2, \ldots, S_x$.

Based on the evaluating at 250, method 240 may determine, at 255, whether the platform has transitioned to a next integrity level that is different than the integrity level "current" during the preceding enforcing at 245. For example, the policy domain may include or otherwise have access to a table 310 (or other such one or more data structures) identifying integrity levels—as represented by the illustrative levels $IL_1, IL_2, \ldots, IL_y$. The integrity levels each represent a different respective level of trust along a scalar range of trust in the security state of the platform—e.g., where $IL_1$ represents a lowest level of trust (in which a relative minimum resource accessibility is allowed) and $IL_y$ represents a highest level of trust (in which a relative maximum resource accessibility is allowed). For each of $IL_1, IL_2, \ldots, IL_y$, table 310 may identify a different respective one or more states of the functional domain as being assigned that integrity level. The particular assignment of the states $S_1, S_2, \ldots, S_x$ to integrity levels by table 310 is merely illustrative, and may vary according to different embodiments. The determining at 255 may include searching one or both of tables 300, 310 to determine that the functional domain has transitioned from a state that is assigned to one of $IL_1, IL_2, \ldots, IL_y$ to another state that is assigned to a different one of $IL_1, IL_2, \ldots, IL_y$.

Where it is determined at 255 that the functional domain has transitioned to a different IL, method 240 may both enforce a different rule set against resource access by the functional domain and attempt a transition of the platform to a higher integrity level. This enforcement and attempted integrity level transition may include operations performed in parallel with one another, although certain embodiments are not limited in this regard. For example, such operations may include, at 260, identifying a next rule set corresponding to the next IL. Table 310 may further list policies—as represented by the illustrative policies $P_1, P_2, \ldots, P_y$—as corresponding to $IL_1, IL_2, \ldots, IL_y$, respectively. The policy information available to the policy domain may further comprise a table 320 (or other such one or more data structures) that lists, for each of the illustrative policies $P_1, P_2, \ldots, P_y$, a different respective set of resource accessibility rules to be enforced according to a policy. As illustrated below, the identifying at 260 may include selecting a rule set from among a plurality of predefined rule sets each of a different respective policy.

By way of illustration and not limitation, table 320 identifies rules $R_1, R_2, \ldots, R_z$ and provides for each of policies $P_1, P_2, \ldots, P_y$ a corresponding bitmap (or other data structure) specifying a different respective combination of rules $R_1, R_2, \ldots, R_z$ that is to be enforced according to the policy. Table 320 includes values "1" and "0" to indicate, respectively, whether an accessibility rule is to be enforced or not enforced. The particular bitmap values shown in table 320 are merely illustrative of one embodiment. In some embodiments, policy information may be updated dynamically during runtime operation of the platform. For example, table 310 may, in another embodiment, merely correspond integrity levels $IL_1, IL_2, \ldots, IL_y$ each with a respective one or more states of $S_1, S_2, \ldots, S_x$ that are assigned that integrity level. In such an embodiment, the association of integrity levels $IL_1, IL_2, \ldots, IL_y$ each with a respective one of policies $P_1, P_2, \ldots, P_y$ may be variable—e.g. by a separate table 330 that may be updated to change the correspondence of $IL_1, IL_2, \ldots, IL_y$ each to a respective one of $P_1, P_2, \ldots, P_y$. The particular correspondence of integrity levels to policies shown in table 310 is merely illustrative of one alternative embodiment.

The identifying of the next rule set at 260 may include performing a search of table 320 based on the policy corresponding to the next integrity level, and identifying which rules are to be enforced (and in some embodiments, which rules are to be unenforced) according to the policy. Method 240 may subsequently configure enforcement of the next rule set, at 262. The configuring at 262 may include some or all operations of the configuring at 220, for example.

Operations to attempt a transition of the platform to a higher integrity level may include, at 270, by PD 130 identifying (e.g, at PD 130) a goal integrity level that is greater than the different integrity level detected most recently at 255. Such identifying of a goal integrity level may include performing calculations such some or all of those represented in FIG. 4. For example, policy information available to the policy domain may define for each of various conditions of the functional domain a respective one or more weight values. One example of such weight values is represented in table 400, which assigns weight values $w_1, w_2, \ldots, w_v$, respectively, to conditions $C_1, C_2, \ldots, C_v$ (e.g., represented in table 300). A given weight value may include or otherwise represent, for example, a predicted likelihood that an attempt to satisfy the condition will fail (or alternatively, succeed). Alternatively or in addition, a given weight value may include or otherwise represent an expected cost—e.g., in terms of time, communications, resource utilization, etc. —to transition to and/or from the condition. As with other policy information discussed herein, data such as that of table 400 may be made available as a priori information provided, for example, from any of a variety of agents—e.g., based on platform modeling, statistical analysis of system performance and/or the like.

In an embodiment, the identifying at 270 includes performing calculations based on weight values such as those assigned in table 400. One or more calculations—as represented by the illustrative calculations 410*a*, 410*b*, . . . , 410*m*—may be performed each to evaluate the possibility of transitioning from a current state $S_r$ assigned to a particular integrity level of some other state assigned to a greater (i.e., more trusted) integrity level. In the example embodiment represented in FIG. 4, calculations 410*a*, 410*b*, . . . , 410*m* are performed to evaluate possible transitions to states $S_{g1}, S_{g2}, \ldots, S_{gm}$, respectively.

Calculations 410*a* may include, for example, determining a difference $\Delta(S_{g1}, S_r)$ between states $S_{g1}$ and $S_r$, where $\Delta(S_{g1}, S_r)$ includes those conditions of $S_{g1}$ that are not satisfied by the current state $S_r$. For example, $\Delta(S_{g1}, S_r)$ may include those one or more conditions that must be false during $S_{g1}$ but are currently true under $S_r$, and/or those one or more conditions that must be true during $S_{g1}$ but are currently false under $S_r$. In the illustrative scenario shown, the conditions $c_{a1}, \ldots, c_{n1}$ of $\Delta(S_{g1}, S_r)$ each represent a respective "true" state or "false" state of a respective one of conditions $C_1, C_2, \ldots, C_v$. In an embodiment, respective weight values $w_{a1}, \ldots, w_{n1}$ of conditions $c_{a1}, \ldots, c_{n1}$ may be determined from table 400 and an aggregate weight values $w_{tot1}$ may be determined—e.g., as a sum or other function of $w_{a1}, \ldots, w_{n1}$. Alternatively or in addition, calculations 410*a* may determine other information such as a difference $\Delta IL_1$ between the respective integrity levels assigned to states $S_{g1}, S_r$ and a cardinality value $k_1$ representing a total number of the conditions $c_{a1}, \ldots, c_{n1}$ of $\Delta(S_{g1}, S_r)$.

Certain embodiments may further include performing calculations, similar to those of calculations 410*a*, for one or more other candidate states assigned to a potential goal integrity level. For example, calculations 410*b* may determine a difference $\Delta(S_{g2}, S_r)$ between another candidate state $S_{g2}$ and $S_r$, and one or more of values $w_{tot2}, \Delta IL_2, k_2$ similar to $w_{tot1}, \Delta IL_1, k_1$, respectively. Alternatively or in addition, calculations 410*m* may determine a difference $\Delta(S_{gm}, S_r)$ between another candidate state $S_{gm}$ and $S_r$, and one or more of values $w_{totm}, \Delta IL_m, k_m$ similar to $w_{tot1}, \Delta IL_1, k_1$, respectively. The total number of one or more candidate states (for example, $S_{g1}, S_{g2}, \ldots, S_{gm}$) to be evaluated may vary—e.g., depending on the number of states that are assigned a greater integrity level than a current integrity level. It is noted that some or all of the cardinality values $k_1, k_2, \ldots, k_m$ may differ from one another.

The identifying of a goal integrity level at 270 may include comparing a result of calculations such as those shown in FIG. 4—e.g., to a threshold value or to another result of such calculations. By way of illustration and not limitation, a goal integrity level may be identified based on a corresponding cardinality value that is a minimum of the cardinality values $k_1, k_2, \ldots, k_m$. Alternatively or in addition, the goal integrity level may be identified based on a corresponding aggregate weight value that, of aggregate weight values $w_{tot1}, w_{tot2}, \ldots, w_{totm}$, represents a highest likelihood of success and/or a minimum resource cost. In some embodiments, a goal integrity level may be selected based on analysis of a combination of cardinality values, aggregate weight values, integrity level differences and/or other such calculations.

Method 240 may further comprise, at 272, identifying a goal condition of a state that is assigned to the goal integrity level identified at 270. For example, if identification of the goal integrity level at 270 includes selecting state $S_{g1}$ represented in FIG. 1, and its assigned integrity level $IL_1$, then conditions $c_{a1}, \ldots, c_{n1}$ need to be satisfied to transition from the current state (in this example, $S_r$) to $S_{g1}$. In this illustrative scenario according to one embodiment, identifying the goal condition at 272 includes identifying one or more of conditions $c_{a1}, \ldots, c_{n1}$. Subsequently, method 240 may, at 274, initiate an operation to satisfy the goal condition identified at 272—e.g., including the initiating at 230. Operations initiated at 274 may include, but are not limited to, signaling the ED 150 to try to affect a state transition—e.g., by updating a malware library, initiating virus cleanup activities, etc. In an embodiment, the next integrity level determined at 255 may be designated, at 280, as the current integrity level for a next iteration of method 240.

Figure 5:
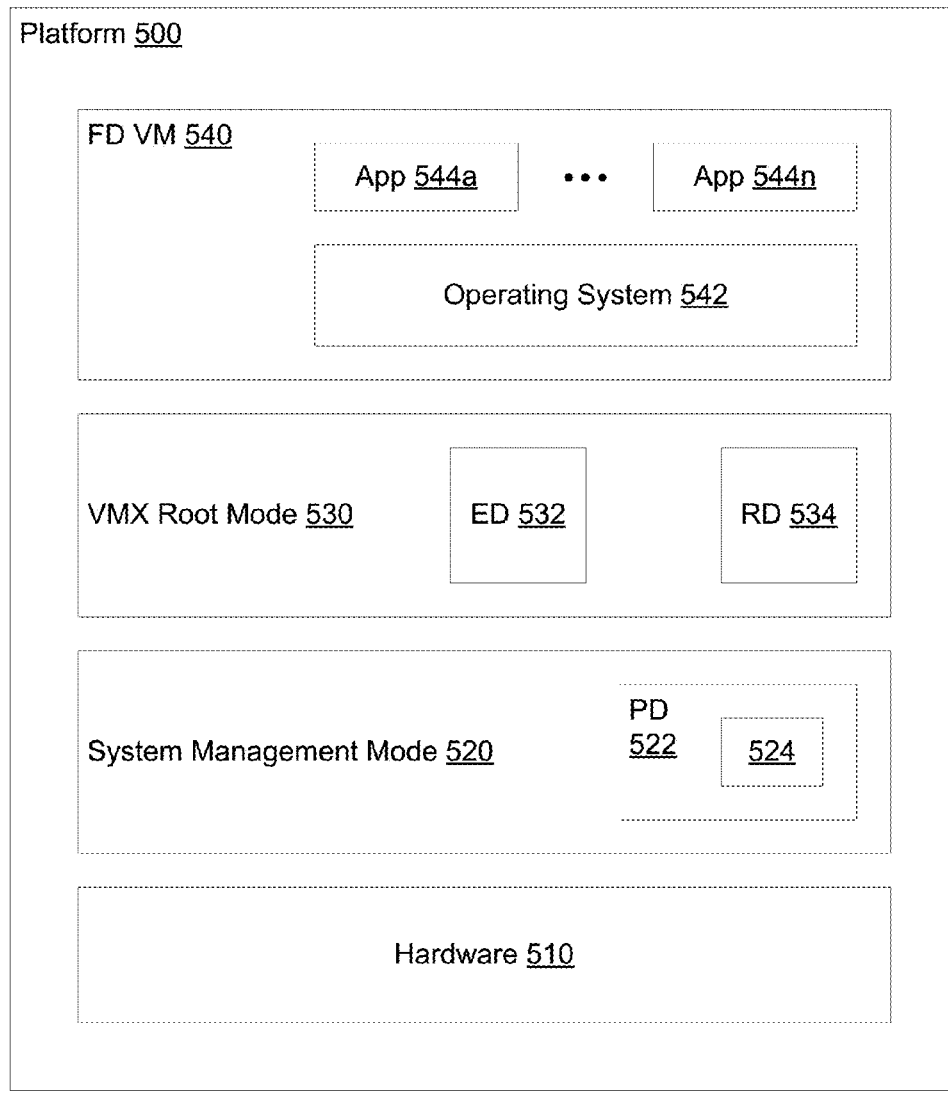
FIG. 5 is a functional block diagram illustrating elements of a platform to change resource accessibility based on an integrity level according to an embodiment.

FIG. 5 illustrates elements of a platform 500 to provide resource accessibility control mechanisms according to an embodiment. Platform 500 may include some or all of the features of platform 105, for example. In an embodiment, logic of platform 500 is configured to perform method 200 and/or method 240. Platform 500 may include resources—represented by the illustrative hardware 510—to be made accessible to a functional domain based on a current level of trust. For example, a functional domain (FD) virtual machine (VM) 540 of platform 500 may be distinguished from processes of a virtual machine extension (VMX) root mode 530 to manage execution of FD VM 540—e.g., including processes adapted from conventional VMX techniques. FD VM 540 may be or otherwise include an execution environment to run an operating system 542 and, in some embodiments, one or more applications 544*a*, . . . , 544*n* executing with operating system 542.

Various access to hardware 510 by FD VM 540 may be selectively prevented and/or allowed by an enforcement domain (ED) 532 based on operations of a report domain (RD) 534 and a policy domain (PD) 524—e.g., where ED 532, RD 534, PD 524 and FD VM 540 provide the respective functionality of enforcement domain 150, report domain 140, policy domain 130 and functional domain 120. Respective processes of ED 532 and RD 534, by virtue of execution in VMX root mode 530, may be protected from at least some access by FD VM 540. For example, FD VM 540 may be prevented from identifying an access rule being enforced against it and/or any policy information that may be a basis for such enforcement. By virtue of execution in system management mode 520, processes of PD 522 may also be protected from some or all direct access by FD VM 540. For example, FD VM 540 may be prevented from policy information 524 used by PD 522 to determine a rule set to enforce with ED 532. In some embodiments, ED 532 and/or RD 534 may also be prevented from direct access to at least some policy information 524.

FIG. 6A illustrates elements of a platform 600 to provide resource accessibility control mechanisms according to an embodiment. Platform 600 may include some or all of the features of platform 105, for example, and may be configured to perform method 200 and/or method 240. Platform 600 may include resources—represented by the illustrative hardware 610—to be made accessible to a functional domain (FD) virtual machine (VM) 624 of platform 600 based on a current level of trust. An execution environment of FD VM 624 may be distinguished from a hypervisor 620 of platform 600 that is to manage execution of FD VM 624.

Access to hardware 610 by FD VM 624—or prevention of such access—may be determined by an enforcement domain (ED) 622 based on operations of a report domain (RD) VM 626 and a policy domain (PD) VM 628, as discussed herein. RD VM 626 and PD VM 628 may each be or include a respective execution environment that is to be distinguished from that of FD VM 624. Alternatively or in addition, ED 622 execute as one or more processes of a hypervisor 620. As a result, FD VM 624 may be prevented from identifying an access rule being enforced against it and/or any policy information that may be a basis for such enforcement. In some embodiments, RD VM 626 may also be prevented from direct access to policy information of PD VM 628—e.g., where such configuration signaling based such policy information is made available to PD VM 628 via hypervisor 620.

FIG. 6B illustrates elements of a platform 630 to control resource accessibility according to another embodiment. Platform 630 may include some or all of the features of platform 105, for example. Hardware 640 and/or other resources of platform 630 may be selectively made accessible to a functional domain (FD) virtual machine (VM) 654 of platform 630 based on a current level of trust in FD VM 654. Execution of FD VM 654 may be managed by a hypervisor 650 that includes an enforcement domain (ED)

652, a report domain (RD) 656 and a policy domain (PD) 658 to provide respective functionality as discussed herein. ED 652, RD 656 and PD 658 may be protected from at least some access by FD VM 654—e.g., wherein FD VM 654 is prevented from identifying an access rule being enforced against it and/or any policy information that may be a basis for such enforcement.

FIG. 6C illustrates elements of a platform 660 to control resource accessibility according to another embodiment. Platform 660 may include some or all of the features of platform 105, for example. Hardware 670 and/or other resources of platform 660 may be selectively made accessible to a functional domain (FD) virtual machine (VM) 696 of platform 660 based on a current level of trust in FD VM 696. Execution of FD VM 696 may be managed by a hypervisor 680 that also supports execution of an enforcement domain (ED) VM 690, a report domain (RD) VM 692 and a policy domain (PD) VM 694 to provide respective functionality as discussed herein. As distinct virtual machines, some or all of ED VM 690, RD VM 692 and PD VM 694 may be variously protected each from at least some access by FD VM 696—e.g., where a hook 682 to access exchange data with one or more of ED VM 690, RD VM 692 and PD VM 694 is inaccessible to FD VM 696.

Figure 7:
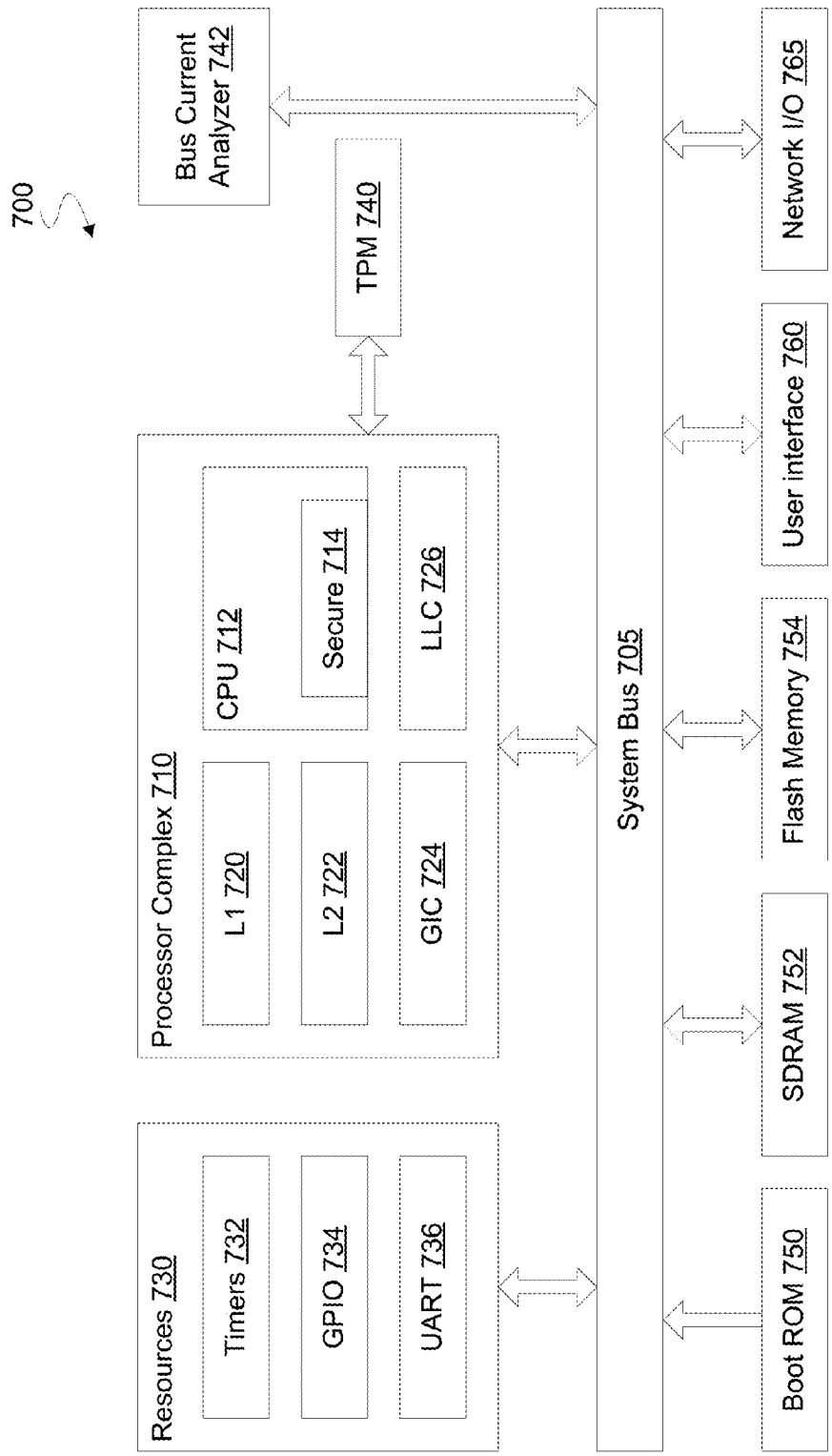
FIG. 7 is a functional block diagram illustrating elements of a computer device to provide access to resources according to an embodiment.

FIG. 7 is a block diagram of an embodiment of a computing system in which resource access may be implemented. System 700 represents a computing device in accordance with any embodiment described herein, and may be a laptop computer, a desktop computer, a server, a gaming or entertainment control system, a scanner, copier, printer, or other electronic device. System 700 may include processor complex 710, which provides processing, operation management, and execution of instructions for system 700. Processor complex 710 may include any type of microprocessor, central processing unit (CPU), processing core, or other processing hardware—as represented by the illustrative CPU 712—to provide processing for system 700. Processor complex 710 controls the overall operation of system 700, and may be or include, one or more programmable general-purpose or special-purpose microprocessors, digital signal processors (DSPs), programmable controllers, application specific integrated circuits (ASICs), programmable logic devices (PLDs), or the like, or a combination of such devices. In the illustrative embodiment shown, processor complex 710 includes a level one cache L1 720 and a level two cache L2 722 to support data caching for CPU 712. Processor complex 710 may further comprise other circuitry, such as the illustrative generic interrupt controller GIC 724 and load line calibration circuitry LLC 726. Although certain embodiments are not limited in this regard, CPU 712 may include a secure region 714 comprising, for example, a dedicated one or more processor cores, system management mode logic and/or other circuitry to provide for at least partial isolation of a functional domain from one or more other domains.

Synchronous dynamic random access memory (SDRAM) 752 represents one example of a main memory of system 700, and provides temporary storage for code to be executed by CPU 712, or data values to be used in executing a routine. SDRAM 752 (or other such random access memory) may store and host, among other things, an operating system to provide a software platform for execution of instructions in system 700. Additionally, other instructions may be stored and executed from SDRAM 752 to provide the logic and the processing of system 700. The operating system and such instructions 738 may be executed by CPU 712.

SDRAM 752 may store data, instructions, programs, or other items. In one embodiment, a memory controller (not shown) is to accesses memory SDRAM 752—e.g., on behalf of CPU 712. Such a memory controller may be incorporated into a packaged device including CPU 712. CPU 712 and SDRAM 752 may be coupled to bus/bus system 705. Bus 705 is an abstraction that represents any one or more separate physical buses, communication lines/interfaces, and/or point-to-point connections, connected by appropriate bridges, adapters, and/or controllers. Therefore, bus 705 may include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

System 700 may also include one or more network input/output (I/O) interface(s) 765, a user interface 760, one or more internal storage device(s) and other resources 730 coupled to bus 705. User interface 760 may include one or more interface components through which a user interacts with system 700 (e.g., video, audio, and/or alphanumeric interfacing). Network I/O interface 765 provides system 700 the ability to communicate with remote devices (e.g., servers, other computing devices) over one or more networks. Network I/O interface 765 may include an Ethernet adapter, wireless interconnection components, USB (universal serial bus), or other wired or wireless standards-based or proprietary interfaces.

Other storage—such as the illustrative boot read only memory (ROM) 750 and flash memory 754—may be or include any conventional medium for storing large amounts of data in a nonvolatile manner, such as one or more magnetic, solid state, or optical based disks, or a combination. Such storage may hold code or instructions and data in a persistent state (i.e., the value is retained despite interruption of power to system 700), and may be generically considered to be a "memory," although SDRAM 752 is the executing or operating memory to provide instructions to CPU 712. Whereas other storage may be nonvolatile, SDRAM 752 may include volatile memory (i.e., the value or state of the data is indeterminate if power is interrupted to system 700).

Resources 730 may include hardware and/or software that is to be selectively made accessible to a functional domain executing with CPU 712. Resources 730 are shown as including timers 732, general purpose input/output circuitry GPIO 734 and a universal asynchronous receiver transmitter UART 736. However, any of a variety of additional or alternative resources of system 700 may be selectively made accessible to a functional domain according to techniques discussed herein. Although certain embodiments are not limited in this regard, system 740 may further comprise a trusted platform module (TPM) 740 to provide cryptographic and/or other security protection mechanisms. In some embodiments, system 700 includes hardware and/or executing software to monitor state of system 700—e.g. to determine whether an integrity level of a functional domain has changed. One example of such monitoring hardware is a bus current analyzer 742 coupled to detect whether a traffic on system bus 705 indicates, for example, a denial of service or other attack by malware affecting the functional domain. In response, accessibility by the functional domain to some or all of resources 730 (and/or other resources of system 700) may be changed in one or more respects.

Techniques and architectures for operating a computing-capable platform are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   first logic including circuitry configured to execute one or more software processes of a functional domain to access resources of the apparatus;
   second logic including circuitry configured to provide an enforcement domain to enforce a first rule set against access by the functional domain to the resources;
   third logic including circuitry configured to provide a report domain to detect, during enforcement of the first rule set, a transition from the functional domain from a first state to a second state, wherein the first state is assigned a first integrity level and the second state is assigned a second integrity level, wherein the second integrity level is an integrity level less than the first integrity level;
   fourth logic including circuitry configured to provide a policy domain, responsive to the transition from the first state to the second state, the fourth logic further configured to:
      identify a second rule set based on a policy corresponding to the second integrity level;
      configure the enforcement domain to enforce the second rule set against access by the functional domain to the resources;
      identify, based on the second integrity level, a condition of a state assigned an integrity level greater than the second integrity level; and
      automatically initiate an operation to cause the condition to be satisfied.

2. The apparatus of claim 1, wherein the first logic is configured to execute a first virtual machine including the functional domain.

3. The apparatus of claim 2, wherein the apparatus is configured to execute a hypervisor including the enforcement domain.

4. The apparatus of claim 3, wherein the hypervisor further includes the policy domain and the report domain.

5. The apparatus of claim 2, wherein the second logic is configured to execute a second virtual machine, wherein the second virtual machine includes the enforcement domain, the third logic is configured to execute a third virtual machine, wherein the third virtual machine includes the report domain, and the fourth logic is configured to execute a fourth virtual machine, wherein the fourth virtual machine includes the policy domain.

6. The apparatus of claim 1, wherein the policy domain is configured to identify the second rule set, wherein, based upon the second rule set, the policy domain is further configured to:
   select the second state from among a plurality of states based on one or more conditions identified by the report domain; and select the second integrity level from among a plurality of integrity levels based on an assignment of the second integrity level to the second state.

7. The apparatus of claim 1, wherein the policy domain is configured to identify the condition, wherein the condition instructs the policy domain to determine a difference between one or more conditions of the second state and one or more conditions of the state assigned the integrity level greater than the second integrity level.

8. The apparatus of claim 7, wherein the policy domain is configured to identify the condition includes the policy domain to calculate a cardinality of the difference.

9. The apparatus of claim 1, wherein the policy domain is configured to identify the condition includes the policy domain to calculate an aggregate weight value based on one or more weight values each corresponding to a respective condition of the second state and one or more weight values each corresponding to a respective condition of the state assigned the integrity level greater than the second integrity level.

10. A method executed at a platform, the method comprising:
   with an enforcement domain of the platform, enforcing a first rule set against access by a functional domain of the platform to resources of the platform;
   during enforcement of the first rule set, detecting a transition from the functional domain from a first state to a second state, wherein the first state is assigned a first integrity level and the second state is assigned a second integrity level, wherein the second integrity level is an integrity level less than the first integrity level;
   in response to detecting the transition from the first state to the second state:
      identifying a second rule set based on a policy corresponding to the second integrity level;
      configuring the enforcement domain to enforce the second rule set against access by the functional domain to the resources based on the second integrity level;
      identifying a condition of a state assigned an integrity level greater than the second integrity level; and
      automatically initiating an operation to cause the condition to be satisfied.

11. The method of claim 10, wherein a first virtual machine includes the functional domain.

12. The method of claim 11, wherein a hypervisor includes the enforcement domain.

13. The method of claim 12, wherein the hypervisor further includes the policy domain and the report domain.

14. The method of claim 11, wherein a second virtual machine includes the enforcement domain, a third virtual machine includes the report domain, and a fourth virtual machine includes the policy domain.

15. The method of claim 10, wherein identifying the second rule set further comprises:
   selecting the second state from among a plurality of states based on one or more conditions identified by the report domain; and
   selecting the second integrity level from among a plurality of integrity levels based on an assignment of the second integrity level to the second state.

16. The method of claim 10, wherein identifying the condition further comprises determining a difference between one or more conditions of the second state and one or more conditions of the state assigned the integrity level greater than the second integrity level.

17. The method of claim 16, wherein identifying the condition further comprises calculating a cardinality of the difference.

18. The method of claim 10, wherein identifying the condition further comprises calculating an aggregate weight value based on one or more weight values each corresponding to a respective condition of the second state and one or more weight values each corresponding to a respective condition of the state assigned the integrity level greater than the second integrity level.

19. A non-volatile computer-readable storage medium having stored thereon instructions which, when executed by one or more processing units, cause the one or more processing units to perform a method comprising:
   with an enforcement domain of the platform, enforcing a first rule set against access by a functional domain of the platform to resources of the platform;
   during enforcement of the first rule set, detecting a transition from the functional domain from a first state to a second state, wherein the first state is assigned a first integrity level and the second state is assigned a second integrity level, wherein the second integrity level is an integrity level less than the first integrity level;
   in response to detecting the transition from the first state to the second state:
      identifying a second rule set based on a policy corresponding to the second integrity level;
      configuring the enforcement domain to enforce the second rule set against access by the functional domain to the resources based on the second integrity level;
      identifying a condition of a state assigned an integrity level greater than the second integrity level; and
      automatically initiating an operation to cause the condition to be satisfied.

20. The computer-readable storage medium of claim 19, wherein a first virtual machine includes the functional domain.

21. The computer-readable storage medium of claim 20, wherein a hypervisor includes the enforcement domain.

22. The computer-readable storage medium of claim 19, wherein identifying the condition further comprises determining a difference between one or more conditions of the second state and one or more conditions of the state assigned the integrity level greater than the second integrity level.

23. The computer-readable storage medium of claim 19, wherein identifying the condition further comprises calculating an aggregate weight value based on one or more weight values each corresponding to a respective condition of the second state and one or more weight values each corresponding to a respective condition of the state assigned the integrity level greater than the second integrity level.

* * * * *